(12) United States Patent
Fujita

(10) Patent No.: US 12,506,166 B2
(45) Date of Patent: Dec. 23, 2025

(54) MEMBRANE ELECTRODE ASSEMBLY, AND PRODUCTION METHOD FOR MEMBRANE ELECTRODE ASSEMBLY

(71) Applicant: TOYOTA JIDOSHA KABUSHIKI KAISHA, Toyota (JP)

(72) Inventor: Keisuke Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 509 days.

(21) Appl. No.: 18/063,322

(22) Filed: Dec. 8, 2022

(65) Prior Publication Data

US 2023/0207848 A1 Jun. 29, 2023

(30) Foreign Application Priority Data

Dec. 24, 2021 (JP) ................................ 2021-210525

(51) Int. Cl.
*H01M 8/1004* (2016.01)
*C25B 1/04* (2021.01)

(52) U.S. Cl.
CPC ............ *H01M 8/1004* (2013.01); *C25B 1/04* (2013.01)

(58) Field of Classification Search
CPC ............................... H01M 8/1004; C25B 1/04
USPC .................... 502/101; 429/481, 483
See application file for complete search history.

(56) References Cited

U.S. PATENT DOCUMENTS

| 7,462,575 B2* | 12/2008 | Hommura | H01M 4/92 502/185 |
| 7,666,809 B2* | 2/2010 | Chiba | H01M 4/90 502/185 |
| 8,007,953 B2* | 8/2011 | Tanuma | H01M 8/0239 429/479 |
| 2004/0009389 A1* | 1/2004 | Sakai | H01M 8/1004 429/534 |
| 2004/0247991 A1* | 12/2004 | Suzuki | H01M 4/8636 429/534 |
| 2006/0019148 A1* | 1/2006 | Tamura | H01M 8/1023 501/153 |
| 2010/0167162 A1* | 7/2010 | Shinoda | H01M 8/1004 429/483 |
| 2010/0196791 A1* | 8/2010 | Fujinami | C08J 5/2206 429/492 |
| 2011/0076593 A1* | 3/2011 | Matsuda | H01M 4/8828 429/483 |
| 2012/0315567 A1* | 12/2012 | Ueda | H01M 8/0245 429/481 |
| 2023/0105398 A1* | 4/2023 | Kaneko | C25B 11/097 429/405 |

FOREIGN PATENT DOCUMENTS

| JP | 2001303285 A | 10/2001 |
| JP | 2003105579 A | 4/2003 |

(Continued)

*Primary Examiner* — Patricia L. Hailey
(74) *Attorney, Agent, or Firm* — Hunton Andrews Kurth LLP

(57) ABSTRACT

To make adhesiveness of a catalyst layer and a solid polymer electrolyte membrane be compatible with electrolysis performance without the need for weighting components even when an electrolyte is included in the catalyst layer, the rate of mass of the electrolyte/the catalyst of the catalyst layer including a catalyst and the electrolyte is more than 0.05 and less than 0.2.

3 Claims, 1 Drawing Sheet

(56) References Cited

FOREIGN PATENT DOCUMENTS

| | | | |
|---|---|---|---|
| JP | 2004360076 | A | 12/2004 |
| JP | 2021095618 | A | 6/2021 |
| WO | 2021193209 | A1 | 9/2021 |

\* cited by examiner

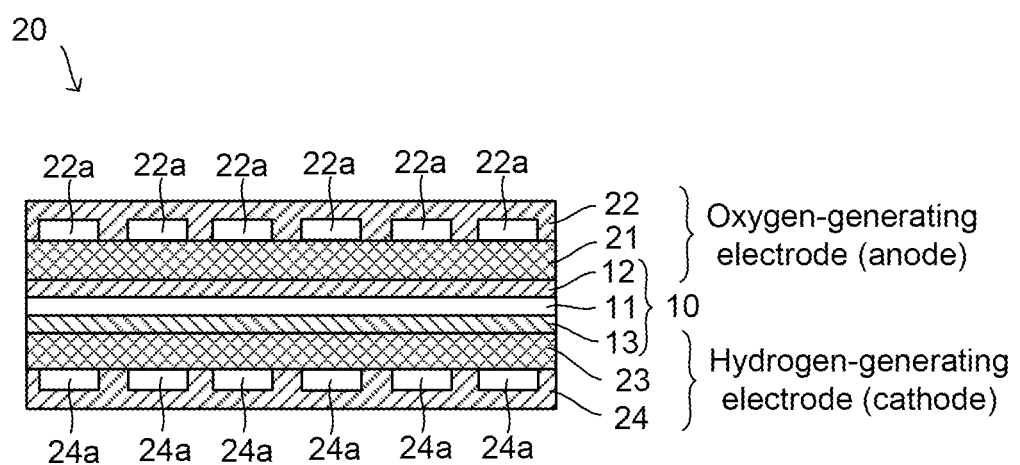

MEMBRANE ELECTRODE ASSEMBLY, AND PRODUCTION METHOD FOR MEMBRANE ELECTRODE ASSEMBLY

CROSS-REFERENCE TO RELATED APPLICATION

This application claims priority to Japanese Patent Application No. 2021-210525 filed on Dec. 24, 2021 which is incorporated herein by reference in its entirety.

FIELD

The present disclosure relates to a membrane electrode assembly to be used for water electrolysis.

BACKGROUND

Patent Literature 1 discloses a membrane electrode assembly made by plating; specifically, iridium (Ir) is deposited on a platinum plated layer to make the membrane electrode assembly.

Patent Literature 2 discloses that a catalyst layer is formed of plural layers, wherein the proportion of an electrolyte and a catalyst in the catalyst layer is varied among the plural layers, so that the amounts of the electrolyte components of the plural layers are weighted in the catalyst layer in the thickness direction. It is also disclosed that at this time, the ratio of catalyst particles and the electrolyte component is 1 to 2:1 in a first layer that is on a solid polymer electrolyte membrane side; and is 3 to 6:1 in a second layer that is in contact with the first layer.

CITATION LIST

Patent Literature

Patent Literature 1: JP 2003-105579 A
Patent Literature 1: JP 2001-303285 A

SUMMARY

Technical Problem

Conventionally, it is necessary to have a catalyst layer formed of plural different layers that have different compositions to make adhesiveness of a solid polymer electrolyte membrane and the catalyst layer compatible with energy efficiency (electrolysis performance) as the above-described prior arts when an electrolyte component is included in the catalyst layer. Such structure however leads to a spread of the moisture contents of the plural layers in the catalyst layer, which easily leads to delamination, which is problematic.

In view of the above problem, an object is to provide a membrane electrode assembly that allows adhesiveness of a catalyst layer and a solid polymer electrolyte membrane to be compatible with electrolysis performance without the need for weighting components even when an electrolyte is included in the catalyst layer.

Solution to Problem

The present application discloses a membrane electrode assembly comprising; a solid polymer electrolyte membrane; and a catalyst layer laid over the solid polymer electrolyte membrane, wherein the catalyst layer includes a catalyst and an electrolyte, and a rate of mass of the electrolyte/the catalyst is more than 0.05 and less than 0.2.

The catalyst layer may be an anode catalyst layer that includes one layer.

The present application is also provided with a production method for a membrane electrode assembly, the method comprising: preparing a composition containing a primary alcohol, a secondary or tertiary alcohol, water, an electrolyte, and a catalyst, and coating a solid polymer electrolyte membrane with the composition, wherein a rate of mass of the electrolyte/the catalyst in the composition is more than 0.05 and less than 0.2.

Advantageous Effects

The present disclosure enables the adhesiveness of the catalyst layer and the solid polymer electrolyte membrane to be compatible with electrolysis performance without the need for weighting components even when an electrolyte is included in the catalyst layer.

BRIEF DESCRIPTION OF DRAWINGS

FIG. 1 is a schematic view illustrating structure of a water electrolytic cell 20.

DESCRIPTION OF EMBODIMENTS

1. Water Electrolytic Cell

FIG. 1 schematically shows a mode of a water electrolytic cell 20. The water electrolytic cell 20 is a unit element for resolving pure water into hydrogen and oxygen. A plurality of such water electrolytic cells 20 are stacked and put in a water electrolytic stack.

Each water electrolytic cell 20 is formed of plural layers. Across a solid polymer electrolyte membrane 11, one side of the water electrolytic cell 20 is an oxygen-generating electrode (anode), and the other side thereof is a hydrogen-generating electrode (cathode). In the anode, an anode catalyst layer 12, an anode gas diffusion layer 21, and an anode separator 22 are stacked in this order from the solid polymer electrolyte membrane 11 side. The cathode is provided with a cathode catalyst layer 13, a cathode gas diffusion layer 23, and a cathode separator 24 in this order from the solid polymer electrolyte membrane 11 side. Here, a membrane electrode assembly (MEA) 10 means a body formed by stacking the solid polymer electrolyte membrane 11, the anode catalyst layer 12 arranged on the solid polymer electrolyte membrane 11 on the anode side, and the cathode catalyst layer 13 arranged on the solid polymer electrolyte membrane 11 on the cathode side.

1.1. Solid Polymer Electrolyte Membrane

The material (electrolyte) of the solid polymer electrolyte membrane 11 is a solid polymer material, and an example thereof is a proton conductive ion exchange membrane that is formed from a fluorine-based resin, a hydrocarbon-based resin material, or the like. This exhibits good proton conductivity (electric conductivity) in a wet state. A more specific example is Nafion (registered trademark), which is a perfluoro electrode membrane.

1.2. Anode Catalyst Layer

The anode catalyst layer 12 according to the present disclosure includes a catalyst, and an ionomer containing an electrolyte. The rate of mass of the electrolyte/the catalyst in the anode catalyst layer 12 is set to be more than 0.05 and less than 0.2. This makes it unnecessary to weight components in the catalyst layer in the thickness direction, and enables the adhesiveness to the solid polymer electrolyte membrane 11 to be secured even when the catalyst layer is, for example, a monolayer; and enables electronic resistance to be compatible with reactive resistance to secure good electrolysis performance. Specifically, the rate of mass less than 0.2 causes electrolysis performance to be secures, and the rate of mass more than 0.05 causes adhesiveness to the solid polymer electrolyte membrane 11 to be secures. As a result, the electrolysis performance can be improved as delamination is suppressed in terms of the entire MEA, which can hold down power consumption.

A conventional anode catalyst layer will be considered. For example, as Patent Literature 2, plural layers form an anode catalyst layer. The ratio of catalyst particles and an electrolyte component in a first layer that is in contact with a solid polymer electrolyte membrane is set to be 1 to 2:1. This is 0.5 to 1.0 when converted into the rate of mass of the electrolyte/the catalyst. In this case, too high a rate of mass of the electrolyte/the catalyst in the first layer causes electrons not to reach some catalyst near the solid polymer electrolyte membrane although the adhesiveness to the solid polymer electrolyte membrane can be secured, so that there is much of the catalyst that cannot be involved in a water electrolysis reaction, which may lower water electrolysis efficiency (electrolysis performance). Similarly, too high a rate of mass of the electrolyte/the catalyst in the first layer leads to less spaces in part of the catalyst layer which is near the solid polymer electrolyte membrane, which increases the volume of $O_2$ which is not discharged even when $O_2$ is generated, which may lead to inefficient progress of a water electrolysis reaction.

Any known catalyst may be included in the anode catalyst layer 12, and examples thereof include iridium oxide, iridium ruthenium cobalt oxide, ruthenium oxide, iridium ruthenium tin oxide, iridium ruthenium iron oxide, iridium ruthenium nickel oxide, iridium tin oxide, iridium zirconium oxide, ruthenium titanium oxide, ruthenium zirconium oxide, ruthenium tantalum oxide, and ruthenium titanium cerium oxide.

Any electrolyte may be included in the anode catalyst layer 12 without particular limitations. The electrolyte same as that used in the solid polymer electrolyte membrane 11 can be included.

1.3. Cathode Catalyst Layer

Any known catalyst may be included in the cathode catalyst layer 13, and examples thereof include platinum, platinised titanium, platinized carbon, palladium on carbon, cobalt glyoxime, and nickel glyoxime.

1.4. Anode Gas Diffusion Layer

Any known anode gas diffusion layer may be used as the anode gas diffusion layer 21 as long as the anode gas diffusion layer 21 is formed of an electroconductive member having gas permeability. A specific example of such a member is a porous electroconductive member formed from a metal fiber or a metal particle.

1.5. Anode Separator

Any known anode separator may be used as the anode separator 22. The anode separator 22 is a member provided with flow paths 22a via which pure water is supplied to the anode gas diffusion layer 21 and via which generated oxygen also flows.

1.6. Cathode Gas Diffusion Layer

Any known cathode gas diffusion layer may be used as the cathode gas diffusion layer 23 as long as the cathode gas diffusion layer 21 is formed of an electroconductive member having gas permeability. A specific example of such a member is a porous member such as a carbon cloth and a carbon paper.

1.7. Cathode Separator

Any known cathode separator may be used as the cathode separator 24. The cathode separator 24 is a member provided with flow paths 24a via which separated hydrogen and attending water flow.

1.8. Hydrogen Generation with Water Electrolytic Cells

Hydrogen is generated from pure water with the above-described water electrolytic cells 20 as follows. Therefore, the water electrolytic cells and water electrolytic stack according to the present disclosure can be provided with any known member and structure necessary to generate hydrogen, other than the above-described members and structures.

An electric current is passed between the anode and the cathode, and thereby, pure water ($H_2O$) supplied via the flow paths 22a of the anode separator 22 to the anode (oxygen-generating electrode) is resolved in the anode catalyst layer 12, which has electric potential then, into oxygen, electrons, and protons ($H^+$). At this time, the protons pass through the solid polymer electrolyte membrane 11 to move to the cathode catalyst layer 13. The electrons separated out in the anode catalyst layer 12 pass through an external circuit to reach the cathode catalyst layer 13. The protons receive the electrons in the cathode catalyst layer 13, so that hydrogen ($H_2$) is generated. The generated hydrogen reaches the cathode separator 24, and is discharged via the flow paths 24a. The oxygen separated out in the anode catalyst layer 12 reaches the anode separator 22, and is discharged via the flow paths 22a.

2. Production Method

For example, the membrane electrode assembly 10 included in each of the water electrolytic cells 20 as the above can be produced as follows.

The electrolyte and the catalyst are mixed in a primary alcohol, a secondary or tertiary alcohol, and water, so that the rate of mass is within the above-described range. The resultant is mechanically dispersed with an ultrasonic homogenizer, filtered for removing excess aggregated particles, and subjected to vacuum defoaming to remove air bubbles, to obtain a composition for the anode catalyst layer 12 as a catalyst ink. Here, examples of the primary alcohol include ethanol, 1-propanol, and 1-butanol; and examples of the secondary or tertiary alcohol include 2-propanol and t-butyl alcohol.

A Teflon (registered trademark) sheet is spray-coated with the composition for the anode catalyst layer 12 (catalyst ink) produced in this way to obtain a catalyst layer A for transfer.

This catalyst layer A for transfer is laid over the solid polymer electrolyte membrane 11 to be hot-pressed, so that the anode catalyst layer 12 is formed on the solid polymer electrolyte membrane 11.

A Teflon (registered trademark) sheet is spray-coated with a composition for the cathode catalyst layer 13 (ink including a catalyst) to obtain a catalyst layer B for transfer.

This catalyst layer B for transfer is laid over a face of the solid polymer electrolyte membrane 11 which is on the opposite side of a face thereof where the anode catalyst layer 12 is laid, to be hot-pressed, so that the cathode catalyst layer 13 is formed on the solid polymer electrolyte membrane 11.

The Teflon (registered trademark) sheets are taken away, so that the membrane electrode assembly 10 can be obtained.

3. Effects Etc.

The present disclosure makes it unnecessary to weight components in the catalyst layer in the thickness direction, and enables the adhesiveness to the solid polymer electrolyte membrane to be secured even when the catalyst layer is, for example, a monolayer; and enables electronic resistance to be compatible with reactive resistance to secure good electrolysis performance.

4. Examples

4.1. Example 1

[Preparing Anode Catalyst Layer]

As adjusted with the balance of water, 6.1 mass % of iridium oxide ($IrO_2$) that was used as a catalyst in an anode catalyst layer, 3 mass % of an electrolytic solution containing an ionomer containing a perfluoro electrolyte (DE2020CS manufactured by DuPont), 38 mass % of ethanol that is a primary alcohol, and 1.3 mass % of a secondary or tertiary alcohol were blended, so that the resultant had a rate of mass of the electrolyte/the catalyst of 0.1. Further, the resultant was filtered for removing excess aggregated particles, and subjected to vacuum defoaming to remove air bubbles to obtain a catalyst ink that was to be the anode catalyst layer.

Next, a Teflon (registered trademark) sheet was spray-coated with this catalyst layer to prepare a catalyst layer A for transfer, so that mass of iridium oxide was 0.8 mg/cm$^2$.

Further, this catalyst layer A for transfer was laid over one face of a perfluoro electrode membrane (Nafion (registered trademark) manufactured by DuPont) as a solid polymer electrolyte membrane, so that the catalyst layer was laid over this face, to be hot-pressed at 145° C., so that the anode catalyst layer was laid over the solid polymer electrolyte membrane.

[Preparing Cathode Catalyst Layer and Membrane Electrode Assembly]

An ink for fuel cell electrodes which contained platinized carbon (manufactured by Tanaka Kikinzoku Kogyo) was used as a catalyst ink for a cathode catalyst layer. A Teflon (registered trademark) sheet was spray-coated with approximately 40 g of this ink to prepare a catalyst layer B for transfer.

Next, this catalyst layer B for transfer was laid over a face (a face on the opposite side of a face where the anode catalyst layer was arranged) of the solid polymer electrolyte membrane, where the prepared anode catalyst layer was laid, so that the catalyst layer was laid over this face, to be hot-pressed at 145° C., so that the cathode catalyst layer was laid over the solid polymer electrolyte membrane.

According to this, a membrane electrode assembly was prepared.

[Electrolysis Performance Test]

The obtained membrane electrode assembly was fitted to a test jig, and the temperature was raised, so that the membrane electrode assembly was 80° C. Pure water was circulated to an anode at 50 ml/min, and voltage was applied from an external power. An electrolysis performance test was performed by obtaining the electrolysis voltage (V) when the current density was 1.0 A/cm$^2$, 2.0 A/cm$^2$, and 3.0 A/cm$^2$.

4.2. Comparative Example 1

[Preparing Membrane Electrode Assembly]

A membrane electrode assembly was prepared in the same manner as in example 1 except that the catalyst ink was prepared, so that the rate of mass of the electrolyte/the catalyst in the anode catalyst layer was 0.2.

[Electrolysis Performance Test]

An electrolysis performance test was performed in the same manner as in example 1.

4.3. Comparative Example 2

[Preparing Membrane Electrode Assembly]

A membrane electrode assembly was tried to be prepared in the same manner as in example 1 except that the catalyst ink was prepared, so that the rate of mass of the electrolyte/the catalyst in the anode catalyst layer was 0.05. However, the solid polymer electrolyte membrane and the anode catalyst layer did not adhere to each other, so that the anode catalyst layer could not be transferred. Thus, the membrane electrode assembly could not be prepared. This is considered to be because the adhesive strength of the interface could not be secured due to an insufficient amount of the ionomer.

4.4. Results

The results are shown in table 1.

TABLE 1

| | Electro-lyte/catalyst | Adhesive-ness | Electrolyte voltage (V) | | |
|---|---|---|---|---|---|
| | | | Current density 1.0 (A/m$^2$) | Current density 2.0 (A/m$^2$) | Current density 3.0 (A/m$^2$) |
| Example 1 | 0.1 | good | 1.67 | 1.75 | 1.83 |
| Comparative example 1 | 0.2 | good | 1.78 | 1.92 | 2.08 |
| Comparative example 2 | 0.05 | bad | — | — | — |

As seen in table 1, in comparative example 1, the adhesiveness was good but the electrolysis voltage was higher than that of example 1 by 0.1 V (100 mV) or more under every condition, and thus, the electrolysis performance lowered compared with example 1. In comparative example 2, the adhesion could not be performed as described above, so that no electrolysis voltage could be obtained.

REFERENCE SIGNS LIST 10 membrane electrode assembly
11 solid polymer electrolyte membrane 12 anode catalyst layer
13 cathode catalyst layer
20 water electrolytic cell
21 anode gas diffusion layer
22 anode separator
23 cathode gas diffusion layer
24 cathode separator

What is claimed is:

1. A membrane electrode assembly comprising;
a solid polymer electrolyte membrane; and
a catalyst layer laid over the solid polymer electrolyte membrane, wherein
the catalyst layer includes a catalyst and an electrolyte, and
a rate of mass of the electrolyte/the catalyst is more than 0.05 and 0.1 or less.

2. The membrane electrode assembly according to claim 1, wherein the catalyst layer is an anode catalyst layer that includes one layer.

3. A production method for a membrane electrode assembly, the method comprising:
preparing a composition containing a primary alcohol, a secondary or tertiary alcohol, water, an electrolyte, and a catalyst, and coating a solid polymer electrolyte membrane with the composition, wherein
a rate of mass of the electrolyte/the catalyst in the composition is more than 0.05 and 0.1 or less.

* * * * *